US012003826B1

(12) United States Patent
Wade et al.

(10) Patent No.: US 12,003,826 B1
(45) Date of Patent: Jun. 4, 2024

(54) SYSTEMS AND METHODS FOR SELECTIVE CONTENT DISTRIBUTION

(71) Applicant: DISH NETWORK L.L.C., Englewood, CO (US)

(72) Inventors: Joshua D. Wade, Castle Rock, CO (US); Edward Neipris, Wrentham, MA (US); Russell Whitney, Whitinsville, MA (US); Jason A. Madruga, Castle Rock, CO (US); Max Stephen Gratton, Parker, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 18/086,343

(22) Filed: Dec. 21, 2022

(51) Int. Cl.
*H04N 21/6405* (2011.01)
*H04N 21/6408* (2011.01)
*H04N 21/6587* (2011.01)

(52) U.S. Cl.
CPC ..... *H04N 21/6405* (2013.01); *H04N 21/6408* (2013.01); *H04N 21/6587* (2013.01)

(58) Field of Classification Search
CPC ........... H04N 21/6405; H04N 21/6408; H04N 21/6587
See application file for complete search history.

(56) References Cited

U.S. PATENT DOCUMENTS

| | | | |
|---|---|---|---|
| 7,600,248 B1 | 10/2009 | Berry | |
| 7,626,641 B1 | 12/2009 | Beals | |
| 7,805,751 B1 | 9/2010 | Dugan et al. | |
| 7,814,510 B1 | 10/2010 | Ergen et al. | |
| 8,098,337 B2 | 1/2012 | Martch | |
| 8,344,859 B2 | 1/2013 | Reams et al. | |
| 8,418,211 B2 | 4/2013 | Beals | |
| 8,461,960 B2 | 6/2013 | Nakano et al. | |
| 8,544,054 B2 | 9/2013 | Reams et al. | |

(Continued)

OTHER PUBLICATIONS

"Chromecast built-in / TVs with Chromecast built-in", https://www.google.com/chromecast/built-in/tv/#/compare, 5 pages.

(Continued)

*Primary Examiner* — Oschta I Montoya
(74) *Attorney, Agent, or Firm* — Jeremiah J. Baunach; VLP Law Group LLP

(57) ABSTRACT

A content selector switch selects, based on a received request for content from a particular remote control device, a multicast network on which to provide the requested particular content. Each multicast network channel of the plurality of multicast network channels is mapped to a respective video channel and each remote control device in the facility (e.g., hotel) is mapped to a respective video channel that the TV controlled by the remote control device stays tuned to. The content selector switch performs the selection by identifying which remote control device in the facility sent the request and selecting the multicast network channel that is mapped to the RF video channel the identified remote control device is mapped to. The content selector switch then provides the specific content on the selected multicast network channel to a multicast-to-channel output device that provides the content on the RF video channel for the TV tuned to that RF video channel to display.

18 Claims, 12 Drawing Sheets

(56) References Cited

U.S. PATENT DOCUMENTS

| | | |
|---|---|---|
| 8,887,209 B2 | 11/2014 | Rudolph et al. |
| 8,941,784 B2 | 1/2015 | Hale et al. |
| 8,983,387 B1 | 3/2015 | MacLean |
| 9,083,914 B2 | 7/2015 | Kummer |
| 9,210,357 B1 | 12/2015 | Dong et al. |
| 9,713,234 B2 | 7/2017 | Gotoh et al. |
| 10,142,668 B1 | 11/2018 | Nijim et al. |
| 10,404,801 B2 | 9/2019 | Martch |
| 11,259,348 B2 | 2/2022 | Ganesa et al. |
| 2003/0140345 A1 | 7/2003 | Fisk et al. |
| 2007/0080823 A1 | 4/2007 | Fu et al. |
| 2007/0081537 A1* | 4/2007 | Wheelock .......... H04N 21/6405 370/392 |
| 2007/0153820 A1* | 7/2007 | Gould .................... H04J 3/245 370/432 |
| 2010/0052870 A1 | 3/2010 | King |
| 2010/0165216 A1 | 7/2010 | Beals |
| 2010/0328132 A1 | 12/2010 | Reams et al. |
| 2012/0242455 A1 | 9/2012 | Hale et al. |
| 2012/0284736 A1* | 11/2012 | Friedman ........... H04N 21/2665 725/116 |
| 2013/0013698 A1* | 1/2013 | Relyea ................. H04L 67/06 709/206 |
| 2013/0057778 A1 | 3/2013 | Hale et al. |
| 2013/0093962 A1 | 4/2013 | Bruhn et al. |
| 2014/0087714 A1 | 3/2014 | Luo et al. |
| 2014/0203920 A1 | 7/2014 | Baker et al. |
| 2014/0267934 A1 | 9/2014 | Hardin |
| 2016/0125733 A1 | 5/2016 | Sallas et al. |
| 2016/0164935 A1* | 6/2016 | Chen ..................... H04L 1/1877 709/219 |
| 2016/0255391 A1 | 9/2016 | Noble |
| 2016/0345054 A1 | 11/2016 | Dhaipule |
| 2017/0019720 A1* | 1/2017 | Chawla ............ H04N 21/41407 |
| 2018/0063716 A1 | 3/2018 | Weigand et al. |
| 2019/0116334 A1 | 4/2019 | Lim et al. |
| 2020/0037025 A1* | 1/2020 | Zerr ................. H04N 21/43637 |
| 2022/0030319 A1 | 1/2022 | Lee et al. |

OTHER PUBLICATIONS

Agarwal, Shubham , "What Is a Chromecast and How Does It Work?", Make Use Of https://www.makeuseof.com/tag/what-is-chromecast-how-does-chromecast-work/, Jul. 7, 2022, 12 pages.

* cited by examiner

302

| Multicast Network Channel | RF Video Channel | Identifier of Remote Video Outlet |
|---|---|---|
| MC: 239.0.0.1 | RF Out: CH 4 | TV 1 Room 101 |
| MC: 239.0.0.2 | RF Out: CH 5 | TV 2 Room 102 |
| . | | |
| . | | |
| . | | |
| MC: 239.0.0.n | RF Out: CH n | TV N Room n |

| RF Video Channel | Remote Control |
|---|---|
| RF Out: CH 4 | Remote Control Device122a |
| RF Out: CH 5 | Remote Control Device 122b |
| . | |
| . | |
| . | |
| RF Out: CH n | Remote Control Device 122n |

*Fig. 3B*

Identify which controller device of a plurality of controller devices sent the request

502

Select the respective multicast network channel of the plurality of multicast network channels that the identified controller device is mapped to

504

SYSTEMS AND METHODS FOR SELECTIVE CONTENT DISTRIBUTION

BRIEF SUMMARY

It is a frequent occurrence that television (TV) set-top boxes, content streaming devices, receiving devices, converters, adapters, Internet-connected TVs and other intelligent hardware fail in multi-room, multi-unit, or multi-tenant facilities. For example, such facilities may include hotels, apartment buildings, dormitories, office buildings and campuses. Such frequent failures result in increased costs for facility owners and inconvenience for guests. To alleviate this problem, it is desirable to have a centralized selective content distribution system that obtains and delivers to the TV, display or other output device the content selected by the remote control device via the system communicating directly with the remote control device, thereby eliminating the need for additional devices in the room having such intelligence.

In an example embodiment, a centralized content selector switch receives a request for particular video content from a remote control device (e.g., from a remote control device in a hotel room). In some example embodiments, this request may be received over a communication path partially or fully separate from the network (e.g., cable network) on which the content is distributed. For example, such a separate communication path may be wireless or wired including, but not limited to, one or more of the following: a WiFi network, a fifth generation (5G) wireless network; a Citizens Broadband Radio Service (CBRS) network, a Zigbee network, a peer-to-peer network or link, a communication link via infrared (IR) sensors, a radio frequency (RF) communication link, or another wired or wireless link or network. In some embodiments, the communication pathway may be partially separate from the network on which the content is distributed. For example, the communication pathway may join or merge with the network on which the content is distributed at one or many points and become a single communication pathway. Also, in some example embodiments, the communication path may be over the same the network on which the content is distributed. The content selector switch then retrieves the particular \content, such as, for example, video content, audio content, text, images or other multimedia content. For example, such content may be retrieved via a unicast, multicast, broadcast, download or other type of connection from a video content source (e.g., a broadcast cable or satellite television signal source, media content server, or content server of a streaming media content provider platform or other source of streaming media content).

In the present example, the content selector switch selects, based on the request, a multicast network channel of a plurality of multicast network channels on which to provide the requested particular video content. In particular, each multicast network channel is mapped by the system to a respective radio frequency (RF) video channel via a specific multicast address identifying the multicast network channel. Furthermore, each remote control device in the facility (e.g., hotel) is mapped to a respective RF video channel that the TV controlled by the remote control device stays tuned to. The content selector switch and remote control device may store the applicable mappings.

The content selector switch performs the selection by identifying which remote control device in the facility sent the request and selecting the multicast network channel that is mapped to the RF video channel the identified remote control device is mapped to. In an example embodiment, the content selector switch then provides the specific video content on the selected multicast network channel to a multicast-to-RF video channel output device (e.g., multicast-to-QAM (quadrature amplitude modulation) output device). This causes the specific video content on the selected multicast network channel to be output on the respective RF video channel that is mapped to that selected multicast network channel (e.g., over a TV coaxial cable). Thus, the TV associated with the remote control device that requested the content is already tuned to the respective RF channel and displays the requested content. In some example embodiments, the tuner is separate from the TV or other presentation device associated with the remote control. Thus, the separate tuner may be associated with the remote control device instead of or in addition to the TV. Various examples of device which may be associated with the remote control device include, but are not limited to: a tuner, receiver, speaker, screen, multimedia device or other presentation device. Thus, the device associated with the remote control that requested the content is already tuned to the respective RF channel and outputs (or causes the output) of the requested content. Such an embodiment and others described herein may eliminate the need for various pieces of intelligent hardware. For example, embodiments described herein may eliminate the need for one or more of: set-top boxes, content streaming devices, receiving devices, converters, adapters, Internet-connected TVs, and/or other intelligent hardware (besides the remote control device) to be in the room where the TV is located. The disclosure herein may refer to video content and video channels in various examples. However, various embodiments may perform the operations and techniques described herein on other content, including audio, images, text and other multimedia content.

Various techniques are also disclosed for addressing the problem of remote control devices being swapped or moved into different rooms or areas in the facility to control different TVs. For example, in one embodiment, the remote control device will cause the TV it is in proximity to (e.g., within IR signal range of) to change to the RF video channel the remote control device is mapped to when the power-on button is pressed on the remote control device, so that the TV will receive content requested by that remote control device on an RF video channel the TV is currently tuned to.

BRIEF DESCRIPTION OF THE DRAWINGS

The components in the drawings are not necessarily to scale relative to each other. Like reference numerals designate corresponding parts throughout the several views.

FIG. 3A is diagram representing an example data structure including multicast network channel to video channel mappings, according to one non-limiting embodiment.

FIG. 3B is diagram representing an example data structure including remote control device pairing mappings according to one non-limiting embodiment.

DETAILED DESCRIPTION

Figure 1A:
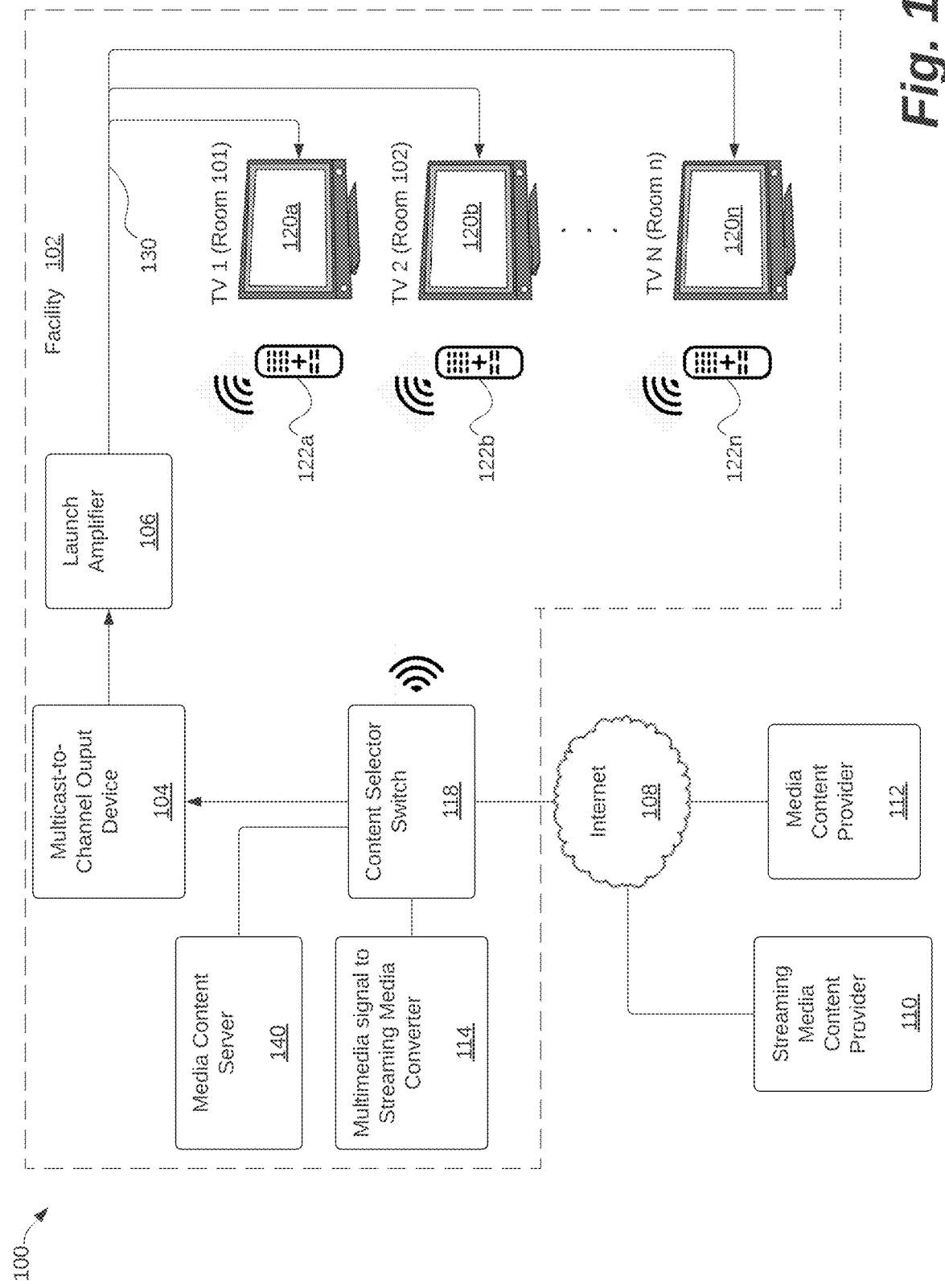
FIG. 1A is a block diagram illustrating an example system for selective content distribution according to one non-limiting embodiment.

FIG. 1A is a block diagram illustrating an example system 100 for selective content distribution according to one non-limiting embodiment.

In the present example, shown are a plurality of presentation devices including televisions (TVs) TV 1 120a, TV 2 120b, . . . , TV N 120n, which may be located in different rooms or areas of a facility 102, such as a hotel, apartment building, office building, school, house, campus, dormitory, sports stadium, restaurant, building or other facility. In the present example, TV 1 120a is in room 101, TV 2 120b is in room 102, and TV N 120n is in room n of the facility 102. There may be fewer or additional presentation devices (e.g., televisions) in various different embodiments. The TVs 120a, 120b, . . . , 120n, in the present example are connected directly to a television cable network of the facility 102, such as via a QAM input or other video input on the TV, and do not require any additional set-top box, additional receiving device, Internet connection or other hardware or software intelligence to operably receive and display the video via the system 100 for selective content distribution, as described herein. Remote control device 122a controls TV 1 120a (e.g., via infra-red or RF signals) and may be in the same room as or may otherwise be in proximity to TV 1 120a. Similarly, remote control device 122b controls TV 2 120b and may be in the same room as or may otherwise be in proximity to TV 2 120b, and remote control device 122n controls TV N 120n and may be in the same room as or may otherwise be in proximity to TV N 120n.

In an example embodiment, the content selector switch 118 receives various requests for particular video content from the remote control devices 122a, 122b, . . . , 122n. In such an embodiment, the content selector switch 118 may be a video selector switch. Such requests may be received via a communication pathway, which may be a wired or wireless network. Examples of such a communication pathway include, but are not limited, one or more of the following: a WiFi network, a fifth generation (5G) wireless network; a Citizens Broadband Radio Service (CBRS) network, a Zigbee network, a peer-to-peer network or link, a communication link via IR sensors, an RF communication link, or another wired or wireless link or network.

For example, the content selector switch 118 may receive a request from remote control device 122a for a movie available from a streaming media content provider, such as streaming media content provider 110. In various other examples, the content selector switch 118 may receive a request from remote control device 122a for content available from media content provider 112 (which is a provider of content other than streaming media), media content server 140 (which may provide any type of stored or live content via a local wired or a wireless connection within facility 102), or multimedia signal to streaming media converter 114.

As one example, this selection may be made via a selection made by remote control device 122a via an electronic program guide (EPG) or menu provided on a display of the remote control device 122a or an EPG or menu displayed on TV 1 120a. The EPG or menu may be provided to the remote control device 122a via a wireless connection between the remote control device 122a and the content selector switch 118 (e.g., via a WiFi network, a 5G wireless network, a CBRS network, a Zigbee network or another wireless network). In the present example embodiment, since TV 1 120a does not have a capability for Internet connectivity, the EPG or menu may be provided to the TV 1 120a from the content selector switch 118 or other information provider over the same television cable network (e.g., via a QAM input or other video input on the TV) over which the TV 1 120a receives video for display.

In the present example embodiment, since TV 1 120a also does not have a capability for two-way communication with remote control device 122a, the EPG provided to the TV 1 120a may display reference numbers identifying particular selectable content which a user may select by entering the applicable reference number in the remote control device 122a. The remote control device 122a may then communicate the selection of particular video content by including the reference number identifying the selected particular video content in a request for the particular video content sent wirelessly from the remote control device 122a to the content selector switch 118. In embodiments in which the TV 1 120a does have a capability for two-way communication with remote control device 122a, an identifier identifying selected content may be sent from the TV 1 120a to the remote control device 122a over a wireless connection (e.g., a Bluetooth, short range wireless, infrared (IR), ultrasonic or Zigbee connection) upon selection of the content being made by the user via the EPG or menu displayed on the TV. In some embodiments, the remote control device 122a may be a smartphone, tablet, user equipment (UE) mobile device, or other wireless device of the user or that is provided by the facility 102 and is configured via a downloadable application or other software (e.g., upon check in to the facility 102) to perform the functions described herein of the remote control device 122a. In some embodiments, such a smartphone, tablet, UE mobile device or other wireless device may have operable IR, ultrasonic or RF control components and functionality to control the TV 1 120a (e.g., TV volume, power and TV settings) or there may also be a separate remote control device present just for controlling TV power, volume and other TV settings. In response to receiving the request from the remote control device 122a, the content selector switch 118 may retrieve over any communication pathway (e.g., the Internet 108, a wired or wireless network, a local area network (LAN), a wide area network (WAN) a cabled connection via a multimedia cable or other cable, etc.) the particular content identified by the request. In the present example, the particular content is video content, which may also include audio. The content selector switch then retrieves the particular video content (e.g., via a unicast, multicast, broadcast or other type of connection from a video content source (e.g., a broadcast cable or satellite television signal source or content server of a streaming media content provider platform or other source of streaming media content). In an example embodiment, the request may include an identifier of the particular selected video content (e.g., movie) and may also identify or indicate (e.g., via network address) the source from which the content is to be retrieved. For example, the selected content may be from a streaming media content provider platform (such as streaming media content provider 10), media content provider 112, media content server 140, or from a device connected to the content selector switch 118 that tunes to and converts broadcast signals (e.g., satellite or cable signals) or other multimedia signals to streaming media content, such as multimedia signal to streaming media converter 114. In the present example, the content selector switch 118 streams the requested particular video content via a unicast or multicast connection over the Internet 108 from streaming media content provider 110 and caches the retrieved content in unicast or multicast format. Various other types of connections to various different types of video or other content sources may be used in various different embodiment to retrieve the particular content.

In the present example embodiment, each remote control device 122a, 122b, ... 122n is mapped to a respective video channel. In various embodiments, the video channel may be: an RF video channel; a QAM video channel; an Advanced Television Systems Committee (ATSC) video channel; a National Television System Committee (NTSC) video channel; an over the air (OTA) video channel; a Phase Alternating Line (PAL) video channel; a Sequential Color with Memory (SECAM) video channel; a Digital Video Broadcast (DVB) video channel; an Integrated Services Digital Broadcasting (ISDB) video channel; a Digital Terrestrial Multimedia Broadcast (DTMB) video channel; a wireless channel; a microwave channel; a CBRS network channel; a high definition multimedia interface (HDMI) channel; a broadcast television system channel; an internet Protocol (IP) channel, or other type of video channel. In the present example embodiment, the video channel is an RF video channel (e.g., a QAM video channel).

In particular, the RF video channel to which remote control device 122a is mapped is associated with a respective video outlet for TV 1 120a by TV 1 120a being tuned to that particular RF video channel. Similarly, the RF video channel to which remote control device 122b is mapped is associated with the respective video outlet for TV 2 120b by TV 2 120b being tuned to that particular RF video channel and the RF video channel to which remote control device 122b is mapped is associated with the respective video outlet for TV N 120n by TV N 120n being tuned to that particular RF video channel. Accordingly, the request received from remote control device 122a by the content selector switch 118 indicates to the content selector switch 118 which RF video channel the remote control device 122a is mapped to.

Then the content selector switch 118 selects, based on the indication in the request of which RF video channel the remote control device 122a is mapped to, a multicast network channel on which to provide the requested particular video content. For example, the multicast network channel may be a User Datagram Protocol/Internet Protocol (UDP/IP) multicast network channel or Transmission Control Protocol/IP (TCP/IP) multicast network channel. In particular, each multicast network channel of a plurality of multicast network channels used by the content selector switch 118 is electronically mapped to a respective RF video channel that is also mapped to a particular remote control device. Thus, in the present example, the content selector switch 118 selects the multicast network channel mapped to remote control device 122a (as indicated in the request) as the multicast network channel on which to provide the requested particular video content.

In an example embodiment, the content selector switch 118 may then convert the retrieved cached video file (e.g., if it is in unicast format) for transmission on the selected multicast network channel to the multicast-to-channel output device 104 (e.g., a multicast-to-video channel output device) and then transmits the selected video content on the selected multicast network channel to the multicast-to-channel output device 104. The multicast-to-channel output device 104 converts the signal containing the selected video content transmitted on the selected multicast network channel to a signal (e.g., a QAM signal) to be output on the RF video channel that is mapped to the selected multicast network channel. The multicast-to-channel output device 104 may determine which RF video is channel mapped to the selected multicast network channel by receiving that information along with or in conjunction with the data sent on the selected multicast network channel or may otherwise receive such information from the content selector switch 118. The multicast-to-channel output device 104 then outputs to a launch amplifier 106 the selected content on the RF video channel that is mapped to the selected multicast network channel.

The launch amplifier 106 amplifies and otherwise adapts the signal containing the selected content received on the RF video channel to be transmitted on the coaxial distribution network 130. The launch amplifier 106 transmits the amplified signal on the coaxial distribution network 130. The signal containing the requested video content is then received by TV 120a on the RF video channel that is mapped to the selected multicast network channel (and also to the remote control device 122a). Since TV 120a is already tuned to the RF video channel mapped to the remote control device 122a that requested the content, there is nothing the user needs to do to view their requested movie on TV1 120a in addition to having requested it via remote control device 122a. TV 2 120b works in a similar manner with respect to remote control device 122b, and TV N 120n works in a similar manner with respect to remote control 122n.

In order to avoid a TV (e.g., TV 120a) from changing to a different channel from that which its respective remote control device is mapped to, in some embodiments, each remote control device (e.g., remote control device 122a) may have the user interface input control on the remote control device that sends commands to change an RF channel (e.g., the channel change button) disabled or not included on the remote control device at all. However, if the RF channel of TV 120a is switched, in some embodiments, the remote control device 122a may have an ability to automatically send a command to TV 120a to switch back to the RF video channel to which the remote control device 122a is mapped (e.g., each time a power-on button is pressed on the remote control device 122a). This same feature may be included on all remote control devices in the facility 102. Thus, this also alleviates the problem of remote control devices being swapped or moved into different rooms or areas in the facility 102 to control different TVs. The remote control device will cause the TV it is in proximity to (e.g., within IR signal range of) to change to the RF video channel the remote control device is mapped to every time the power-on button of the remote control device is pressed. This causes the TV to receive content requested by that remote control device on a channel the TV is currently tuned to.

Thus, in an example embodiment, the request for content is received from a remote control device of a plurality of remote control devices and each remote control device of the plurality of remote control devices is mapped to a respective RF video channel of the plurality of RF video channels. The respective RF video channel mapped to the multicast network channel is also the respective RF video channel mapped to the remote control device from which the request is received. The remote control device may cause a device (e.g., a TV) controlled by the remote control device to change to the RF video channel the remote control device is mapped to upon every activation of a power-on user interface element of the remote control device.

As another solution to address the problem of the remote control devices being swapped or moved into different rooms or areas in the facility 102, in one embodiment, the remote control devices dynamically map to whatever RF video channel the TV in proximity to the remote control device is tuned to (which should be the RF video channel that the content selector switch 118 has on record as currently being mapped to the video outlet connected to that TV). This may be performed, for example, by remote control device 122a sending a pairing signal (e.g., over a WiFi network, a 5G wireless network, a CBRS network, a Zigbee network or another wireless network) to the content selector switch 118 each time a button is pressed on the remote control device 122a. In response to receiving such a pairing signal, the content selector switch 118 sends a pairing code over the RF video channel that the content selector switch 118 has on record as the remote control device 122a currently being mapped to. For example, this may be an ultrasonic pairing code output by the TV that is tuned to the RF video channel. In response to receiving such an ultrasonic pairing code, the remote control device 122a is configured to return whatever pairing code it received to the content selector switch 118 via a wireless connection. If the content selector switch 118 receives the pairing code from remote control device 122a in response, this tells the content selector switch 118 that the remote control device 122a is still mapped to the RF video channel the content selector switch 118 has on record for that remote control device 122a.

If the content selector switch 118 does not receive the pairing code in response from the remote control device 122a, then this tells the content selector switch 118 that remote control device 122a is no longer in proximity to TV 120a (e.g., has been moved to another room), and thus an update needs to be made to the mapping of that remote control device 122a such that the remote control device 122a is mapped to whatever RF video channel that the TV currently in proximity to the remote control device is tuned to, which should be the RF video channel that the content selector switch 118 has on record as currently being mapped to the video outlet connected to that TV. To perform this update, in order to find where the remote control device 122a has been moved to, the content selector switch 118 transmits a pairing code over each RF video channel, wherein the pairing code is unique to the particular the RF video channel it is being sent over. When the content selector switch 18 receives a response from the remote control device 122a, the pairing code received in the response is then used to identify which RF video channel the remote control device should be mapped to, as the received pairing code is unique to that RF video channel on which it was sent. Then content selector switch 118 updates the mapping of the remote control device 122a to the identified RF video channel accordingly.

Thus, in an example embodiment, the request for content is received from a remote control device of a plurality of remote control devices in the facility 102 and each remote control device of the plurality of remote control devices is mapped to a respective RF video channel of the plurality of RF video channels. The respective RF video channel mapped to the multicast network channel is also the respective RF video channel mapped to the remote control device from which the request is received. The content selector switch 118 causes the plurality of remote control devices to dynamically map to whatever RF video channel the output device that is in proximity to remote control device is tuned to.

In another example embodiment, the content selector switch 118 may locate each of remote control devices 122a, 122b, . . . 122n using global positioning system (GPS) or other electronic location tracking of the remote control device. In such embodiments, the content selector switch 118 and each of remote control devices 122a, 122b, . . . 122n has such GPS or other electronic location tracking hardware and/or software functionality present and enabled. Using such location tracking, the content selector switch 118 causes each of the remote control devices 122a, 122b, . . . 122n to dynamically map to whatever RF video channel the content selector switch has on record that the output device in proximity to remote control device is tuned to.

As yet another solution to address the problem of the remote control devices being swapped or moved into different rooms or areas in the facility 102, upon every activation of a power-on button of the remote control device as explained above, the content selector switch 118 instead maps the remote control device to an RF video channel from a bank of available RF video channels to which to map the remote control device. The remote control device receives a message back from the content selector switch 118 indicating which RF video channel it is now mapped to, which causes the remote control device to send a command to the TV in proximity to the remote control device (e.g., via an IR signal) to change its RF video channel to the indicated RF video channel. In this manner, upon a power-on button on the remote control device being pressed, an updated mapping will occur to an available RF video channel that is not currently mapped to another remote control device and TV.

Thus, in an example embodiment, upon every activation of a power-on user interface element of the remote control device, the content selector switch 118 maps the remote control device to an RF video channel from a bank of available RF video channels of the plurality of RF video channels to which to map the remote control device. The remote control device then causes a device (e.g., a TV) controlled by the remote control device to change to the RF video channel the remote control device is mapped to.

In various embodiments, the content selector switch 118 interconnects to one or more communications media or sources (such as a cable head-end, satellite antenna, telephone company switch, Ethernet portal, off-air antenna, or the like) which provide the video content that may be distributed as described herein. Also, in various embodiments, the content selector switch 118, the multicast-to-channel output device 104 and/or the multimedia signal to streaming media converter 114 may be located outside of the facility 102, such as in a co-located data center or other remote location.

Figure 1B:
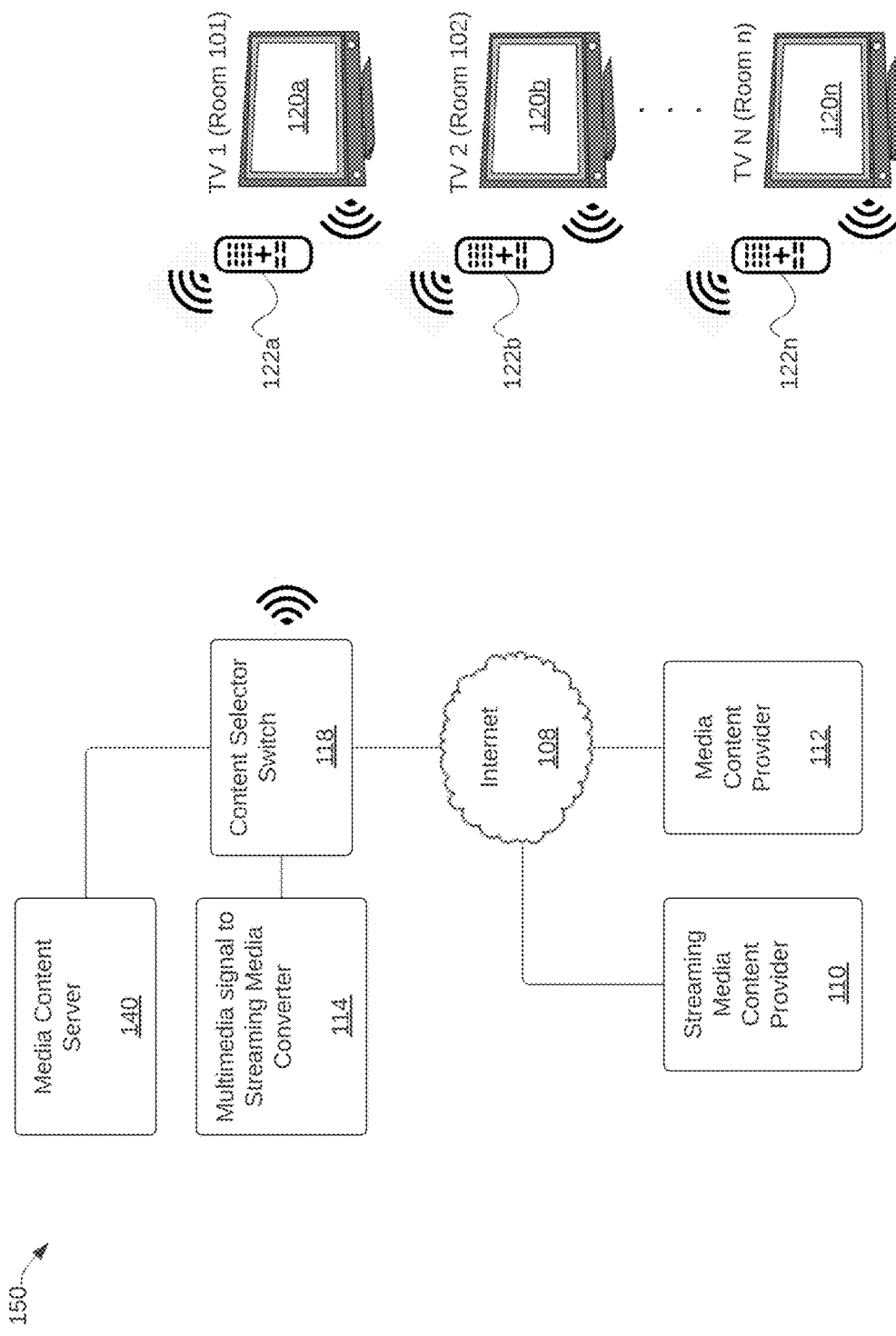
FIG. 1B is a block diagram illustrating an example system for selective content distribution, according to another non-limiting embodiment.

FIG. 1B is a block diagram illustrating an example system 150 for selective content distribution, according to another non-limiting embodiment.

The system 150 differs from the system 100 of FIG. 1A in that the content selector switch 118 outputs the requested video content on a respective wireless video channel mapped to the multicast network channel that is mapped to the remote control device from which the request is received. For example, the respective video channel may be an over the air (OTA) RF video channel that TVs 120*a*, 120*b*, . . . 120*n* are able to receive. In various different embodiments, the multicast-to-channel output device 104 of FIG. 1A may be integrated with or separate from the content selector switch 118. Also, the launch amplifier 106 of FIG. 1A is not included in such a wireless environment such as that of system 150. The wireless network over which the remote control devices 122*a*, 122*b*, . . . 122*n* communicate with the content selector switch 118, however, may still be a different wireless network (such as a WiFi network, a 5G wireless network, a CBRS network, a Zigbee network or another wireless network) than the wireless network over which the video content is distributed. In some embodiments, the TVs 120*a*, 120*b*, . . . 120*n* may have the capability to receive content via a multicast video network, in which case the content selector switch 118 may provide the requested content to the particular TV listening to the multicast network channel that is mapped to the remote control device from which the request is received, without the requested content needing to be output on an RF video channel.

The above description of the system 100 and system 150, the facility 102, and the various devices therein, is intended as a broad, non-limiting overview of example environments in which various embodiments of systems and methods for selective content distribution may be implemented. FIG. 1A and FIG. 1B illustrate just examples of systems for selective content distribution and the various embodiments discussed herein are not limited to such environments. In particular, system 100, system 150 and the various devices therein, may contain other devices, systems and/or media not specifically described herein. For example, in some embodiments, the content selector switch 118, the multicast-to-channel output device 104, the launch amplifier 106 and the multimedia signal to streaming media converter 114 may be embedded or otherwise located in other components or devices and the TVs 120*a*, 120*b*, . . . 120*n* may be various different types of displays or other types of presentation devices.

Example embodiments described herein provide applications, tools, data structures and other support to implement systems and methods for selective content distribution. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2A:
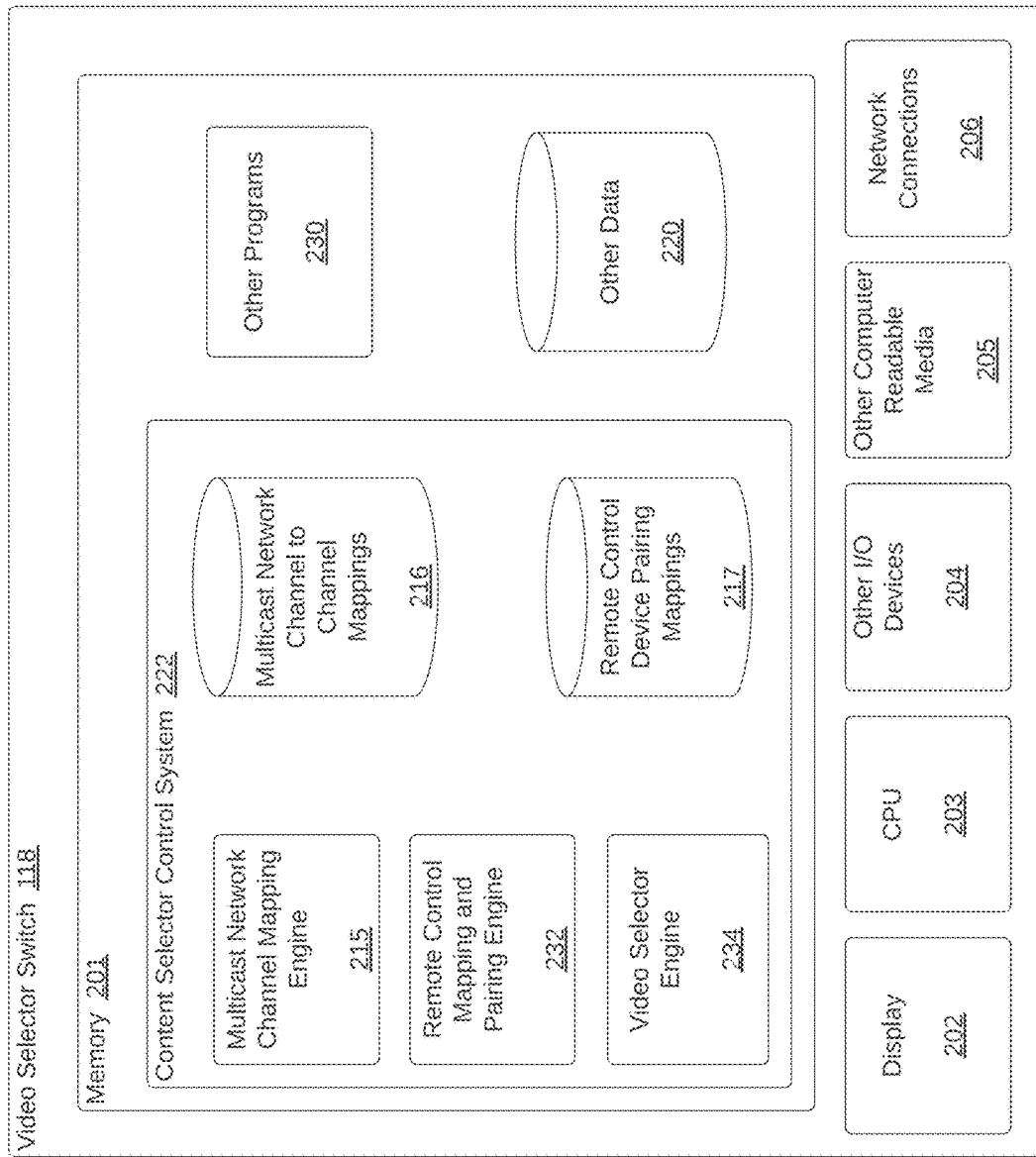
FIG. 2A is a block diagram illustrating elements of an example content selector switch having a video selector control system for selective content distribution, according to one non-limiting embodiment.

FIG. 2A is a block diagram illustrating elements of an example content selector switch 118 having a video selector control system 222 for selective content distribution, according to one non-limiting embodiment.

One or more general purpose or special purpose computing systems/devices may be used to operate and store information regarding the content selector switch 118, and communicate over the Internet 108 and with other devices shown in FIG. 1. In addition, in an example embodiment, the content selector switch 118 may comprise one or more distinct computing systems/devices and may span distributed locations. Furthermore, each block shown may represent one or more such blocks as appropriate to a specific embodiment or may be combined with other blocks. Also, the video selector control system 222 of the content selector switch 118 may be implemented in software, hardware, firmware, or in some combination to achieve the capabilities described herein.

In the embodiment shown, content selector switch 118 comprises a computer memory (memory) 201, a display 202, one or more Central Processing Units (CPU) 203, Input/Output devices 204 (e.g., touchpad, keyboard, mouse, RF or IR transceiver, ultrasonic signal generator, light emitting diode (LED) panel or liquid crystal display (LCD), USB ports, other communication ports, and the like), other computer-readable media 205, and network connections 206. The multicast network channel mapping engine 215, the remote control mapping and pairing engine 232 and the video selector engine 234 portions of the video selector control system 222 are shown residing in memory 201. In other embodiments, some portion of the contents, and some, or all, of the components of the multicast network channel mapping engine 215, the remote control mapping and pairing engine 232 and the video selector engine 234 may be stored on and/or transmitted over the other computer-readable media 205. The video selector engine 234 preferably executes on one or more CPUs 203 and facilitates the selective content distribution as described herein. The video selector control system 222 also facilitates communication with peripheral devices, multimedia signal to streaming media converter 114, multicast-to-channel output device 104, remote control devices 122*a*, 122*b*, . . . 122*n*, streaming media content provider 110, and media content provider B 112 via the I/O devices 204 and network connections 206. For example, such network connections 206 may include those that enable the content selector switch 118 to communicate via a WiFi network, a 5G wireless network, a CBRS network, a Zigbee network, GPS system, and/or the Internet 108, etc.

The multicast network channel mapping engine 215 may perform the mappings of the multicast network addresses to the respective video channels and possibly to the associated remote video outlets or TVs as described herein, and then store such mappings in the multicast network channel to channel mappings storage 216 for subsequent reference and updating. For example, the remote control mapping and pairing engine 232 may perform the mappings of remote controls devices to the respective video channels and perform the various associated remote control device pairings as described herein, and then store such mappings in the remote control device pairing mappings storage 217 for subsequent reference and updating. The video selector engine 234 may perform the selection, based on the received request from a remote control device, of a multicast network channel of a plurality of multicast network channels on which to provide the requested particular video content.

Other code or programs 230 (e.g., an audio/video processing module, a Web server, and the like), and potentially other data repositories, such as other data store 220, also reside in the memory 201, and preferably execute on one or more CPUs 203. Of note, one or more of the components in FIG. 2 may not be present in any specific implementation. For example, some embodiments may not provide one or more of the various other I/O devices 204 or a display 202.

In some embodiments, the video selector control system 222 includes an application program interface (API) that provides programmatic access to one or more functions of the video selector control system 222. Such an API may provide a programmatic interface to one or more functions of the video selector control system 222 that may be invoked by one of the other programs 230 or some other module. In this manner, the API enables software, such as user interfaces, plug-ins and adapters to integrate functions of the video selector control system 222 into desktop computer or mobile device applications, and the like. In addition, the API may be, in at least some embodiments, invoked or otherwise accessed via the video selector control system 222, or via peripheral systems or remote entities, such as the multimedia signal to streaming media converter 114, remote control devices 122a, 122b, . . . 122n or streaming media content provider systems to access various functions of the video selector control system 222.

In an example embodiment, components/modules of the video selector control system 222 are implemented using standard programming techniques. For example, the multicast network channel mapping engine 215, the remote control mapping and pairing engine 232 and the video selector engine 234 may be implemented as a "native" executable running on the CPU 203, along with one or more static or dynamic libraries. In other embodiments, the multicast network channel mapping engine 215, the remote control mapping and pairing engine 232 and the video selector engine 234 may be implemented as instructions processed by a virtual machine that executes as one of the other programs 230 or by using containerization (e.g., using Kubernetes or Docker). In general, a range of programming languages known in the art may be employed for implementing such example embodiments, including representative implementations of various programming language paradigms, including but not limited to, object-oriented (e.g., Java, JavaScript, Python, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, XML, and the like).

In a software or firmware implementation, instructions stored in a memory configure, when executed, one or more processors of the content selector switch 118 to perform the functions of the video selector control system 222 described herein. In one embodiment, instructions cause the CPU 203 or some other processor, such as an I/O controller/processor, to perform selective content distribution as described herein. Similarly, the CPU 203 or other processor(s) may be configured to perform other operations such as storing, organizing and converting content and tracking viewing habits and interaction with remote control devices 122a, 122b, . . . 122n.

The embodiments described above may also use well-known or other synchronous or asynchronous client-server computing techniques. However, the various components may be implemented using more monolithic programming techniques as well; for example, as an executable running on a single CPU computer system, or alternatively decomposed using a variety of structuring techniques known in the art, including but not limited to, multiprogramming, multithreading, client-server, or peer-to-peer, containerization, running on one or more computer systems each having one or more CPUs. Some embodiments may execute concurrently and asynchronously, and communicate using message passing techniques. Equivalent synchronous embodiments are also supported by a receiving device video selector control system 222 implementation. Also, other functions could be implemented and/or performed by each component/module, and in different orders, and by different components/modules, yet still achieve the functions of the video selector control system 222.

In addition, programming interfaces to the data stored as part of the video selector control system 222 can be available by standard mechanisms such as through C, C++, C#, and Java APIs; RESTful APIs; libraries for accessing files, databases, or other data repositories; scripting languages such as XML; or Web servers, FTP servers, or other types of servers providing access to stored data. The multicast network channel to channel mappings storage 216 and the remote control device pairing mappings storage 217 may be implemented as one or more database systems, file systems, data structures or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to UDP/IP sockets, TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the video selector control system 222.

Furthermore, in some embodiments, some or all of the components of the video selector control system 222 may be implemented or provided in other manners, such as at least partially in firmware and/or hardware, including, but not limited to one or more application-specific integrated circuits ("ASICs"), standard integrated circuits, controllers (e.g., by executing appropriate instructions and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a non-transitory computer-readable storage medium to be read by an appropriate drive or via an appropriate connection, such as random access memory (RAM) or flash memory device) so as to enable or configure the computer-readable medium and/or one or more associated computing systems or devices to execute or otherwise use or provide the contents to perform at least some of the described techniques. A transitory computer-readable medium as used herein means a signal transmission itself (for example, a propagating electrical or electromagnetic signal itself) and not the hardware medium on which information is stored. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 2B:
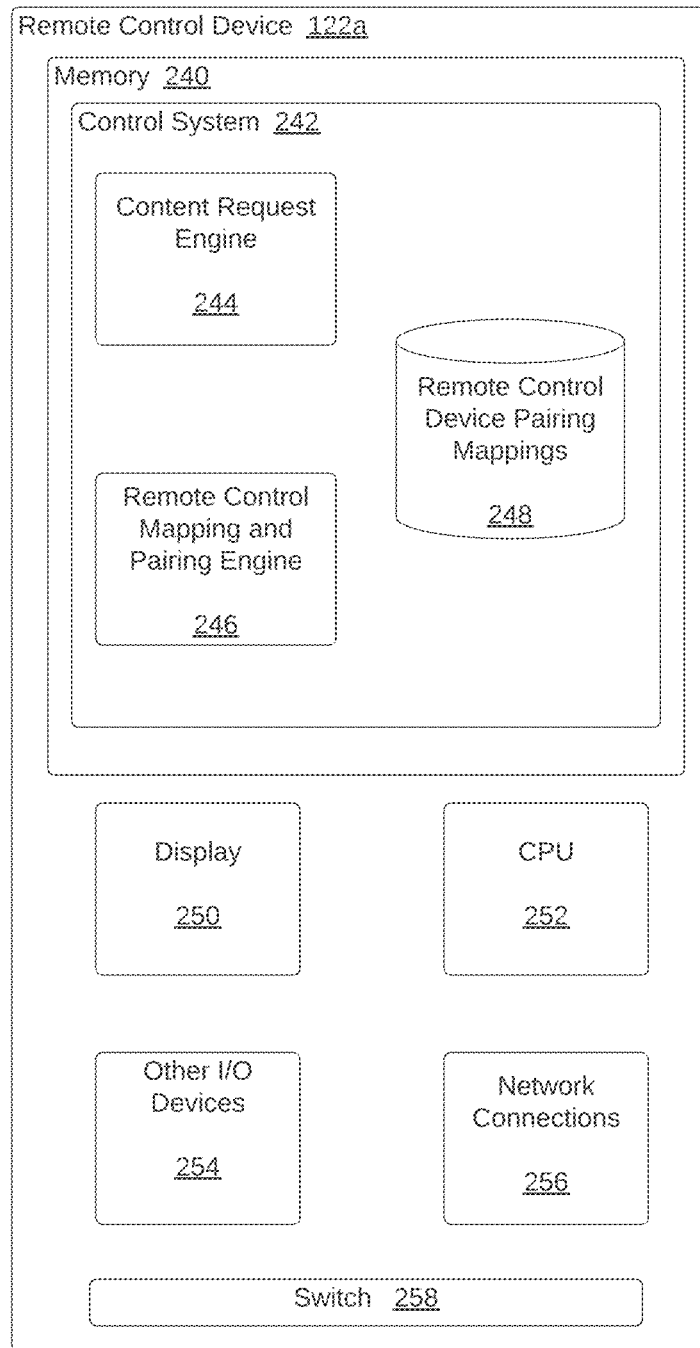
FIG. 2B is a block diagram illustrating elements of an example remote control device for selective content distribution, according to one non-limiting embodiment.

FIG. 2B is a block diagram illustrating elements of an example remote control device 122a for selective content distribution, according to one non-limiting embodiment. Although the present example shown is for remote control device 122a, such a configuration may also be applicable to the other remote control devices 122b, . . . 122n of FIG. 1A and FIG. 1B.

In one embodiment, one or more general purpose or special purpose computing devices may be used within remote control device 122a to operate and store information regarding remote control device 122a, and communicate with TVs 120a, 120b, . . . 120n, communicate with content selector switch 118, communicate over the Internet 108 and communicate with other devices shown in FIG. 1A and FIG. 1B. Furthermore, in various different embodiments, each block shown may represent one or more such blocks as appropriate to a specific embodiment or may be combined with other blocks. Also, the control system 242 of the remote control device 122a may be implemented in software, hardware, firmware, or in some combination to achieve the capabilities described herein.

In the embodiment shown, remote control device 122a comprises a computer memory (memory) 240, a display 250, one or more Central Processing Units (CPU) 252, other Input/Output devices 254 (e.g., touchpad, keypad, mouse, RF or IR transceiver, ultrasonic receivers and/or transmitters, light emitting diode (LED) panel or liquid crystal display (LCD), USB ports, other communication ports, and the like), and network connections 206. For example, such network connections 256 may include those that enable the remote control device 122a to communicate via a WiFi network, a 5G wireless network, a CBRS network, a Zigbee network, GPS system and/or the Internet 108, etc., to perform operations as described herein.

The content request engine 244 may transmit a request for particular video content (e.g., a movie, television program, or other piece of video content) to the content selector switch 118 as described herein, such as over a WiFi network, a 5G wireless network, a CBRS network, a Zigbee network or another wireless network connection. For example, such a request may be in response to user input to a user interface of the remote control device 122a via other I/O devices 254. The remote control mapping and pairing engine 246 may perform various remote control mappings to particular video channels, presentation devices (e.g., TVs), multicast video channels, and/or video outlets via communication with the content selector switch 118 and presentation devices as described herein and store such mappings in the remote control device pairing and mappings storage 248 for subsequent reference and updating. The memory 240 may also include other non-volatile memory used to store other data, such as an EPG, user settings and device configurations, such as those to enable or disable certain buttons or user interface elements (e.g., a channel change button).

The remote control device 122a may include a switch 258 such that the remote control device 122a may be switched to being mapped to an RF video channel of the applicable network according to the location of the remote control device 122a within the facility 102.

FIG. 3A is diagram representing an example multicast network channel to video channel mappings data structure 302 including multicast network channel to video channel mappings, according to one non-limiting embodiment.

For example, the multicast network channel to video channel mappings data structure 302 including multicast network channel to video channel mappings may be stored, maintained and updated in the multicast network channel to channel mappings storage 216 of the content selector switch 118 shown in FIG. 2A. In the present example, in addition to other mappings, the multicast network channel to video channel mappings shown in the multicast network channel to video channel mappings data structure 302 indicate multicast channel having multicast address 239.0.0.1 is mapped to RF video channel CH 4, which is associated with a remote video outlet identified as TV 1 Room 101.

FIG. 3B is diagram representing an example remote control device pairing mappings data structure 304 including remote control device pairing mappings according to one non-limiting embodiment.

For example, the remote control device pairing mappings data structure 304 including remote control device pairing mappings may be stored, maintained and updated in the remote control device pairing mappings storage 217 of the content selector switch 118 shown in FIG. 2A and the remote control device pairing mappings storage 248 of the remote control device 122a shown in FIG. 2B. In the present example, in addition to other mappings, the remote control device pairing mappings shown in the remote control device pairing mappings data structure 304 indicate remote control device 122a is paired to RF video channel CH 4.

For example, in response to receiving a request for content from remote control device 122a, the content selector switch 118 may refer to the remote control device pairing mappings data structure 304 to determine which RF video channel video channel remote control device 122a is mapped to. Based on a determination that remote control device 122a is mapped to RF video channel CH 4, as indicated in the remote control device pairing mappings data structure 304, the content selector switch 118 selects multicast channel having multicast address 239.0.0.1 on which to provide the requested particular video content by referring to the multicast network channel to video channel mappings data structure 302, which indicates multicast channel having multicast address 239.0.0.1 is mapped to RF video channel CH 4.

The multicast network channel to video channel mappings data structure 302 and remote control device pairing mappings data structure 304 may, in various other embodiments, be stored in one data structure and/or may also be stored at a remote storage location accessible by the content selector switch 118 and wirelessly accessible by the remote control devices 122a, 122b, . . . 122n.

In an example embodiment, the facility 102 of FIG. 1A may have so many TVs that it is greater than the number of available RF video channels on a single RF content distribution network (e.g., single cable network). In such instances, it may be useful to for the facility 102 to implement two such RF content distribution networks and include remote control devices that are mapped to more than one RF video channel, such that a single remote control device is also mapped to an RF video channel of each additional RF content distribution network.

In an example embodiment, the remote control device 122a is mapped to a respective additional RF video channel of an additional plurality of RF video channels, wherein each additional RF video channel of the additional plurality of RF video channels is mapped to a respective multicast network channel of an additional plurality of multicast network channels. In such embodiments, the remote control device 122a may include a switch 258 such that the remote control device 122a may be manually or automatically switched (e.g., based on GPS or other electronic location tracking of the remote control device) to being mapped to an RF video channel of the applicable network according to the current location of the remote control device 122a within the facility 102.

Figure 4:
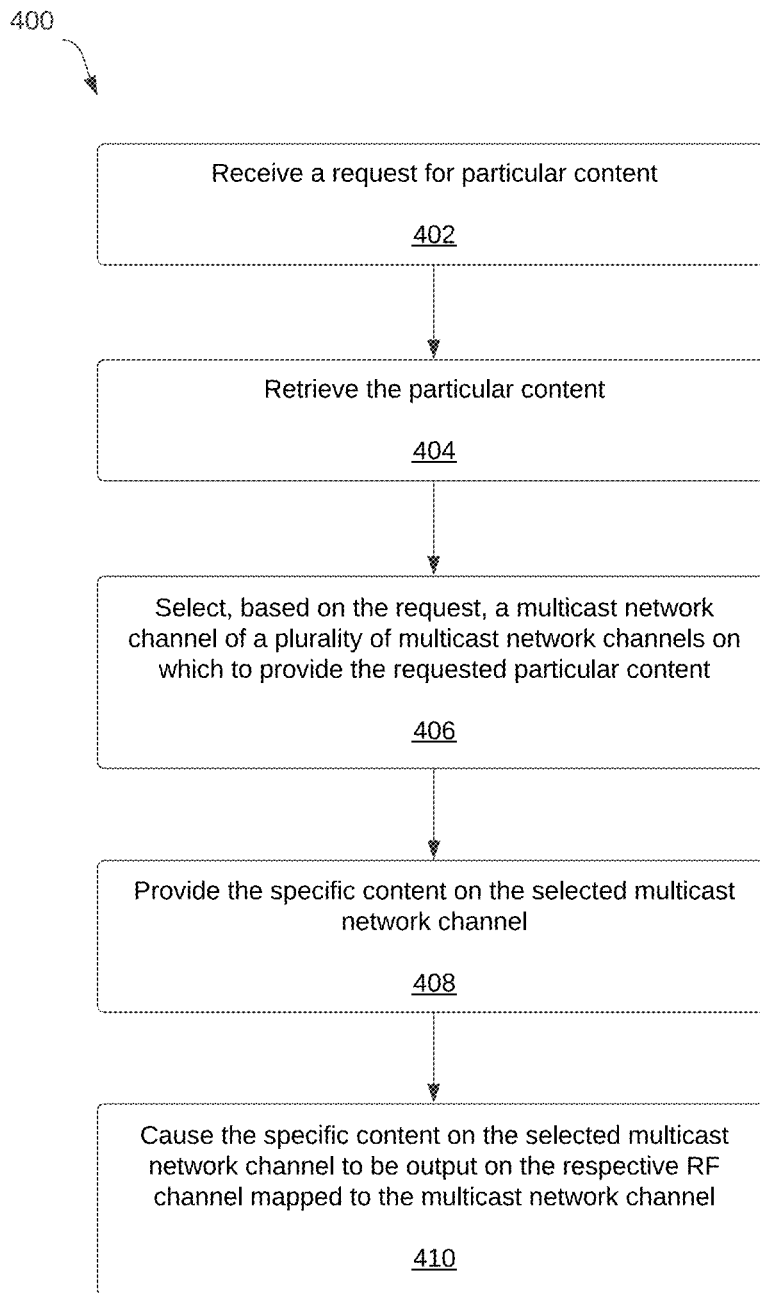
FIG. 4 is a flow diagram of an example method for selective content distribution, according to one non-limiting embodiment.

FIG. 4 is a flow diagram of an example method 400 for selective content distribution, according to one non-limiting embodiment.

At 402, the content selector switch 118 electronically receives a request for particular content. For example, the request may be received from remote control device over a WiFi network, a 5G wireless network, a CBRS network, a Zigbee network or another wireless network.

At 404, the content selector switch 118 electronically retrieves the particular content. The particular content may be downloaded via a unicast connection over the Internet from a content server of a streaming media content provider platform or other content provider. As another example, The particular content may be retrieved as streaming media content via a unicast or multicast connection directly from a device that converts broadcast satellite or cable signals to the streaming media content.

At 406, the content selector switch 118 electronically selects, based on the request, a multicast network channel of a plurality of multicast network channels on which to provide the requested particular content. Each multicast network channel is electronically mapped to a respective channel of a plurality of channels. In an example embodiment, the plurality of channels is a plurality of RF channels and the respective channel mapped to the multicast network channel is a respective RF channel of the plurality of RF channels. For example, each multicast network channel of the plurality of multicast network channels is mapped to a respective RF video channel via a specific multicast address identifying the multicast network channel. In an example embodiment, the request is received from a remote control device of a plurality of remote control devices in a facility, and each remote control device is mapped to a respective RF channel of the plurality of RF channels. The respective RF channel mapped to the multicast network channel is the respective RF channel mapped to the remote control device from which the request is received.

At 408, the content selector switch 118 provides the specific content on the selected multicast network channel.

At 410, the content selector switch 118 causes the specific content on the selected multicast network channel to be output on the respective channel mapped to the multicast network channel. For example, this may be performed by the content selector switch 118 providing the specific content on the selected multicast network channel to a multicast-to-channel output device to which the content selector switch 118 has communicated which respective channel is mapped to the multicast network channel. In some embodiments, the multicast-to-channel output device may be integrated with or is otherwise part of the content selector switch 118.

In an example embodiment, the content selector switch 118 causes the output on the respective RF channel mapped to the multicast network channel to be received by a respective presentation device that is controlled by a remote control device that sent the request. In the present example, the remote control device sent the request over a wireless network separate from a network on which the plurality of multicast network channels is on.

In an example embodiment, the content selector switch 118 causes the output on the respective RF channel mapped to the multicast network channel to be output over an RF coaxial television cable network and received by a respective presentation device of a plurality of presentation devices directly connected to the RF coaxial television cable network (e.g., via a QAM input on the presentation device). In the present example, the presentation device is controlled by a remote control device that sent the request over a wireless network different than and separate from the RF coaxial television cable network and also different than and separate from a network on which the plurality of multicast network channels is on.

In another example embodiment, the content selector switch 118 causes the output on the respective RF channel mapped to the multicast network channel to be output over a wireless network and received by a respective presentation device of a plurality of presentation devices connected to the wireless network. In this example, the presentation device is controlled by a remote control device that sent the request over a different wireless network separate from the wireless network on which the respective RF channel is output and different than and separate from a network on which the plurality of multicast network channels is on.

Figure 5:
FIG. 5 is a flow diagram of an example method, useful in the method of FIG. 4, for selecting a multicast network channel, according to one non-limiting embodiment.
Figure 5:

FIG. 5 is a flow diagram of an example method 500, useful in the method 400 of FIG. 4, for selecting a multicast network channel, according to one non-limiting embodiment. The following example embodiments may refer to video content and video channels in various examples. However, various embodiments may perform the operations and techniques described herein on other content, including audio, images, text and other multimedia content.

At 502, the content selector switch 118 identifies which controller device of a plurality of controller devices sent the request, wherein each controller device of the plurality of controller devices is mapped to a respective RF channel. In an example embodiment, the request is received over a different network separate from a network on which the plurality of multicast network channels is on. In another example embodiment, the request is received from a remote control device over a wireless network different than and separate from a network on which the plurality of multicast network channels is on.

At 504, the content selector switch 118 selects the respective multicast network channel that is mapped to a respective RF video channel the identified controller device is mapped to.

Figure 6:
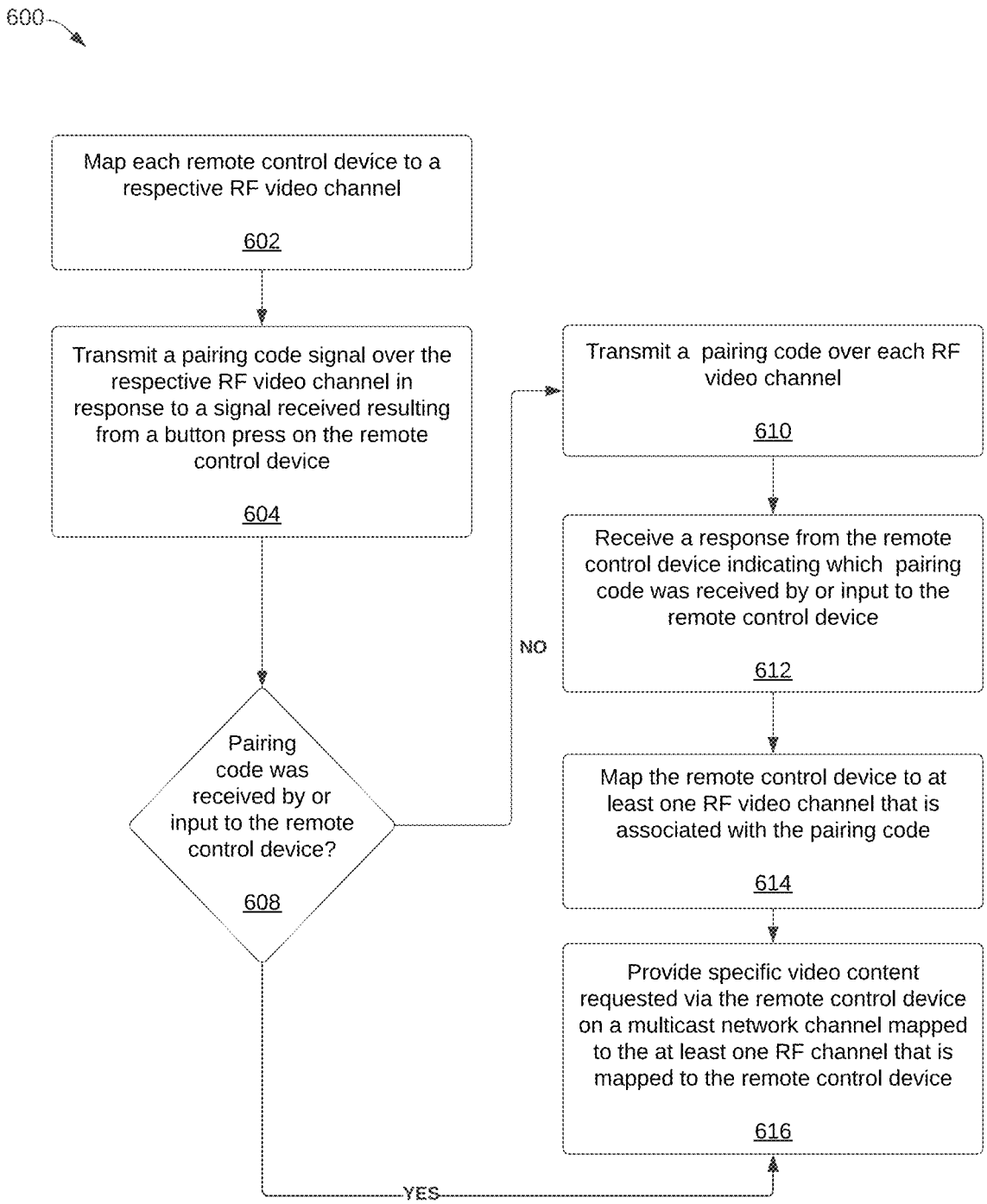
FIG. 6 is a flow diagram of an example method, useful in the method of FIG. 4, for pairing the remote control device to an RF channel, according to one non-limiting embodiment.

FIG. 6 is a flow diagram of an example method 600, useful in the method 400 of FIG. 4, for pairing the remote control device to an RF video channel, according to one non-limiting embodiment.

At 602, the content selector switch 118 maps each remote control device to a respective RF video channel.

At 604, the content selector switch 118, in response to a signal received resulting from a button press on the remote control device, transmits a pairing code signal over the respective RF video channel. For example, this may occur for each button press on the remote control device. In one embodiment, the transmitting of a pairing code signal over the respective RF video channel may be performed for each remote control device of the plurality of remote control devices, in response to each signal received resulting from each button press on the remote control device.

Also, a response from the remote control device indicating whether the pairing code was received by the remote control device may be received via a wireless network different than and separate from a network on which the respective RF channel is output and different than and separate from a network on which the plurality of multicast network channels is on. In various embodiments, the wireless network via which the response from the remote control device indicating whether the pairing code was received by the remote control device may be a WiFi network, a 5G wireless network, a CBRS network, a Zigbee network or another wireless network.

In various embodiments, the pairing code may be: an ultrasonic code output via a device tuned to the respective RF video channel; an audio signal output via a device tuned to the respective RF video channel; a visual code output via a device tuned to the respective RF video channel and displayed on a presentation device; an IR code output via a device tuned to the respective RF video channel; or a QR code output via a device tuned to the respective RF video channel and displayed on a presentation device.

At 608, the content selector switch 118 makes a determination of whether a response from the remote control device was received indicating the pairing code was received by or input to the remote control device. If a determination is made that there was a response received from the remote control device indicating the pairing code was received by or input to the remote control device, the method 600 proceeds to 616. If a determination is made that there was not a response received from the remote control device indicating the pairing code was received by or input to the remote control device, the method 600 proceeds to 610.

At 610, the content selector switch 118 transmits a pairing code over each RF video channel of the plurality of RF video channels, wherein the pairing code is associated with to the RF video channel. In some embodiments, the pairing code may be unique to the RF channel.

At 612, the content selector switch 118 receives a response from the remote control device indicating which pairing code was received by or input to the remote control device.

At 614, the content selector switch 118 maps the remote control device to at least one RF video channel of the plurality of RF video channels that is associated with the pairing code. In some embodiments, the mapping the remote control device to at least one RF channel of the plurality of RF channels that is associated the pairing code includes mapping the remote control device to a plurality of RF channels. In other embodiments, the mapping the remote control device to at least one RF channel of the plurality of RF channels that is associated the pairing code includes mapping the remote control device to exactly one RF channel, wherein the pairing code is unique to the RF channel over which the pairing code is transmitted.

At 616, the content selector switch 118 provides the specific video content requested via the remote control device on a multicast network channel mapped to the RF channel that is currently mapped to the remote control device.

Figure 7:
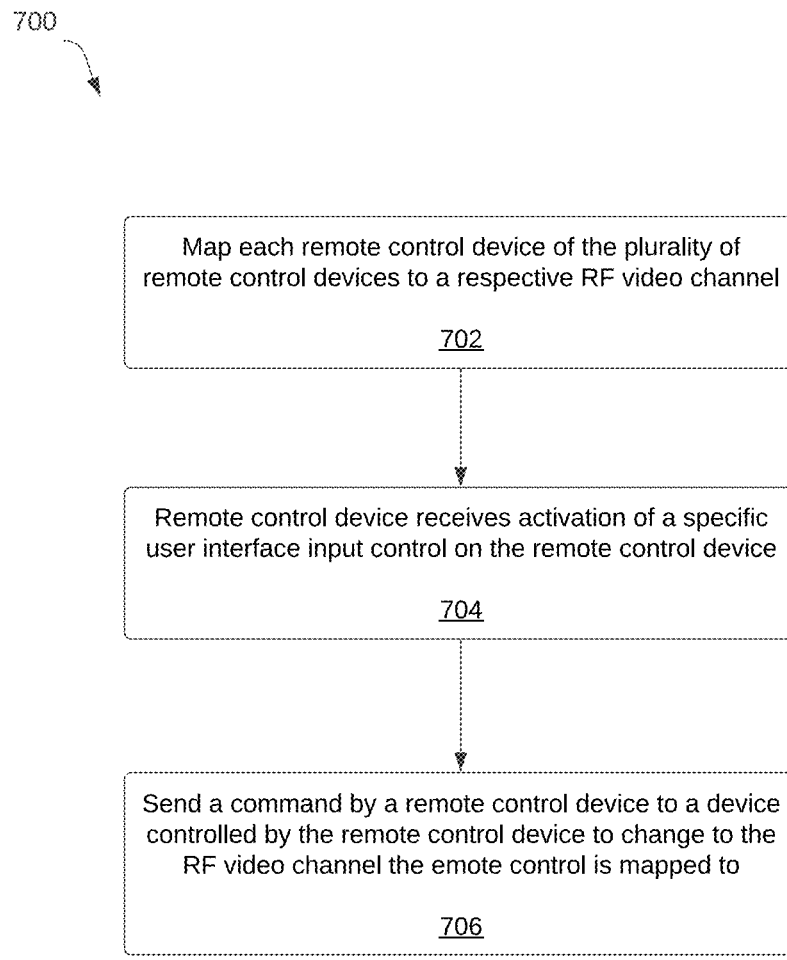
FIG. 7 is a flow diagram of an example method, useful in the method of FIG. 4, for causing a device controlled by the remote control device to change to the RF channel the remote control device is paired to, according to one non-limiting embodiment.

FIG. 7 is a flow diagram of an example method 700, useful in the method 400 of FIG. 4, for causing a device controlled by the remote control device to change to the RF video channel the remote control device is paired to, according to one non-limiting embodiment. For example, method 700 may be useful in the method 400 of FIG. 4 when the request is received from a remote control device of a plurality of remote control devices and in which method 700 is performed by each remote control device of the plurality of remote control devices.

At 702, a remote control device (e.g., remote control device 122a) records a mapping of the remote control device to a respective RF video channel of the plurality of RF video channels. For example, the remote control device may receive this mapping from the content selector switch 118. In an example embodiment, the plurality of RF video channels are provided on a cable network to which devices controlled by the plurality of remote control devices are connected.

At 704, the remote control device receives indications of an activation of a specific user interface input control on the remote control device. For example, the specific user interface input control may be a power-on button.

At 706, the remote control device, in response to each activation of the specific user interface input control on the remote control device, sends a command to a device (e.g., a TV) controlled by the remote control device to change to the respective RF video channel the remote control device is mapped to.

In an example embodiment, the facility 102 of FIG. 1A may have so many TVs that it is greater than the number of available RF video channels on a single RF content distribution network (e.g., single cable network). In such instances, it may be useful to for the facility 102 to implement two such RF content distribution networks and include remote control devices that are mapped to more than one RF video channel, such that a single remote control device is also mapped to an RF video channel of each additional RF content distribution network.

Thus, in an example embodiment, the remote control device may also be mapped to a respective additional RF video channel of an additional plurality of RF video channels, wherein each additional RF video channel of the additional plurality of RF video channels is mapped to a respective multicast network channel of an additional plurality of multicast network channels. The remote control device may include a switch to switch the remote control device between modes of: in response to each activation of a specific user interface input control on the remote control device, sending a command to a device controlled by the remote control to change to the respective RF video channel; and in response to each activation of a specific user interface input control on the remote control device, sending a command to a device controlled by the remote control to change to the respective additional RF video channel. In this manner, the remote control device may be switched to being currently mapped to an RF video channel of the applicable network according to the location of the remote control device.

Figure 8:
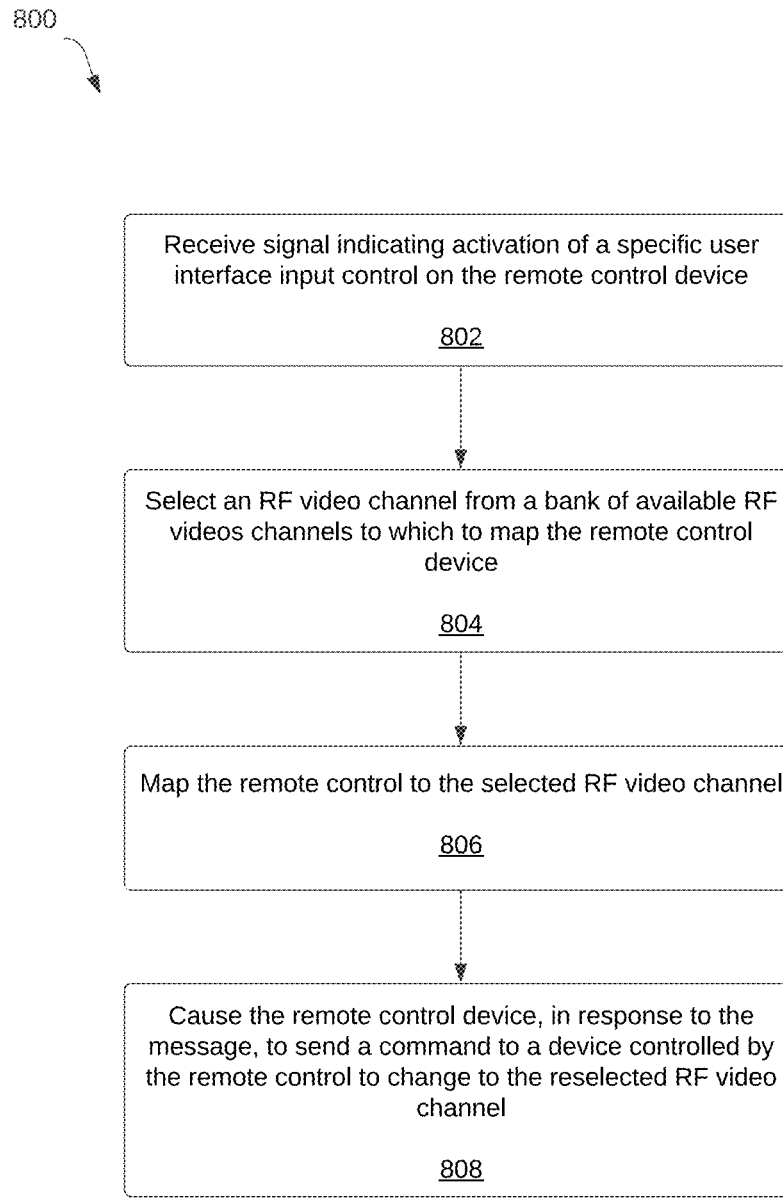
FIG. 8 is a flow diagram of an example method, useful in the method of FIG. 4, for mapping a remote control device to an RF channel from a bank of available RF channels, according to one non-limiting embodiment.

FIG. 8 is a flow diagram of an example method 800, useful in the method 400 of FIG. 4, for mapping a remote control device to an RF video channel from a bank of available RF videos channels, according to one non-limiting embodiment. For example, method 800 may be useful in the method 400 of FIG. 4 when the request is received from a remote control device of a plurality of remote control devices and in which method 800 is performed for each remote control device of the plurality of remote control devices.

At 802, the content selector switch 118 receives indications of activations of a specific user interface input control on the remote control devices. For example, the specific user interface input control may be a power-on button.

At 804, content selector switch 118, in response to receiving each indication of the activation of the specific user interface input control on the remote control device, selects an RF video channel from a bank of available RF video channels of the plurality of RF video channels to which to map the remote control device. In an example embodiment, the plurality of RF video channels are provided on a cable network to which devices controlled by the plurality of remote control devices are connected.

At 806, the content selector switch 118 electronically maps the remote control to the selected RF video channel.

At 808, the content selector switch 118 transmits a message to the remote control device indicating the selected RF video channel, thereby causing the remote control device, in response to the message, to send a command to a device (e.g., a TV) controlled by the remote control device to change to the selected RF video channel. Also, in some embodiments, a user interface input control to send a command to change an RF channel (e.g., a channel change button) is disabled or is not present for one or more of the remote control devices 122a, 122b, . . . 122n.

Figure 9:
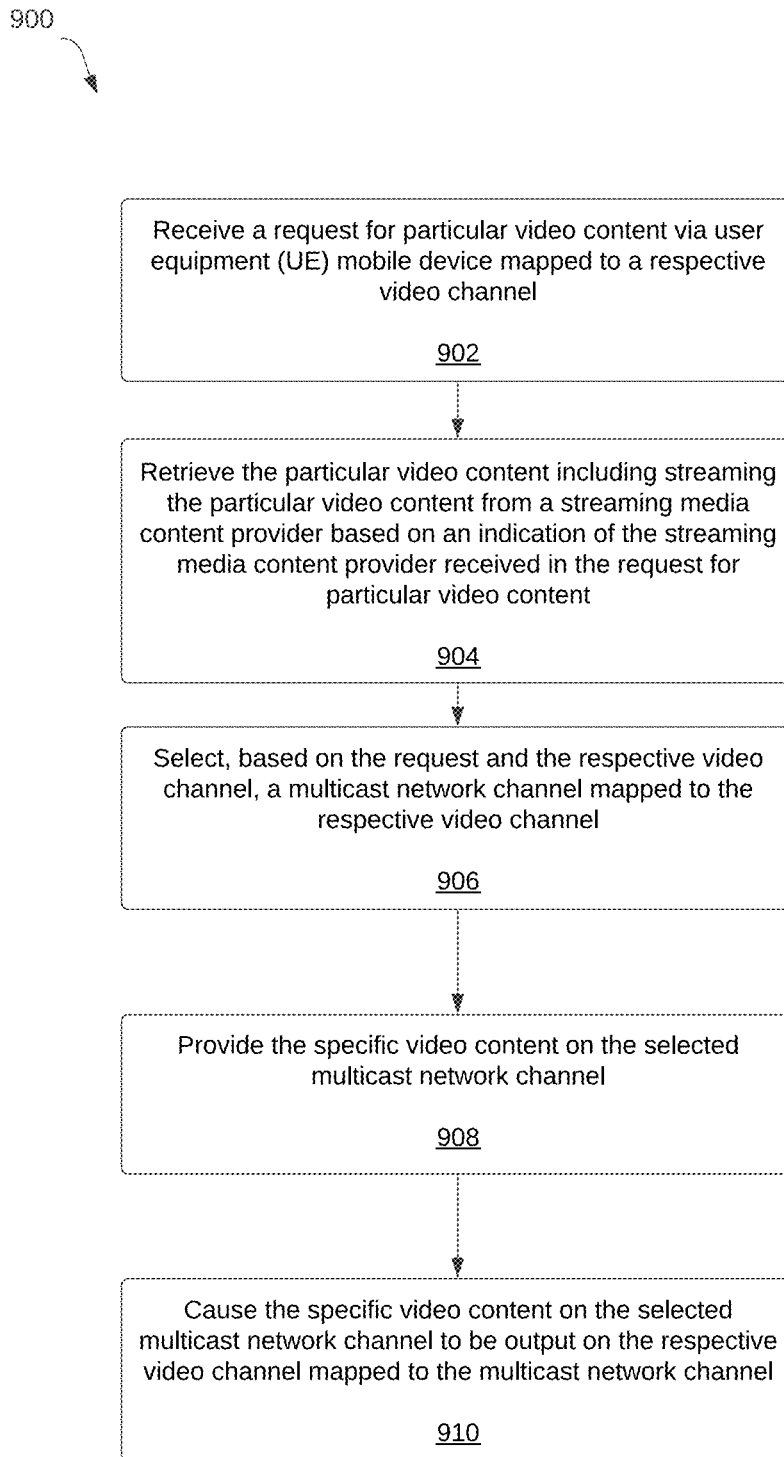
FIG. 9 is a flow diagram of an example method for selective content distribution involving a user equipment (UE) mobile device requesting particular video content, according to one non-limiting embodiment.

FIG. 9 is a flow diagram of an example method 900 for selective content distribution involving a user equipment (UE) mobile device requesting particular video content, according to one non-limiting embodiment.

Various embodiments disclosed herein enable a UE mobile device to become a "remote control" for castable applications (e.g., Netflix®/YouTube®). The video still needs to display on the screen of the presentation device, so in that instance, the content selector switch 118 may act as a video casting device. For example, a UE mobile device of a user may electronically tell content selector switch 118 (e.g., via a request over a wireless network) to log in to the castable application (e.g., Netflix®/YouTube®) and then start retrieving a stream from those services. The system 100 then follows the processes disclosed herein to display the selected content on the applicable presentation device (e.g., TV 1 120a, TV 2 120b, . . . , or TV N 120n). Various pairing methods may be utilized as disclosed herein to pair a particular UE mobile device to a particular video channel (and thus a particular presentation device), including, for example that described with respect to FIG. 10.

As one example, at 902, the content selector switch 118 electronically receives a request for particular video content via a UE mobile device mapped to a respective video channel.

At 904, the content selector switch 118 electronically retrieves the particular video content. For example, this may include streaming the particular video content from a streaming media content provider based on an indication of the streaming media content provider received in the request for particular video content. In some instances, such a request may cause the content selector switch 118 to log in to a castable application (e.g., Netflix®/YouTube®) and then start retrieving a stream from those services.

At 906, the content selector switch 118 electronically selects, based on the request and the respective video channel, a multicast network channel mapped to the respective video channel. The multicast network channel is a multicast network channel of a plurality of multicast network channels on which to provide the requested particular video content. Each multicast network channel of the plurality of multicast network channels is electronically mapped to a respective video channel of a plurality of video channels.

908, the content selector switch 118 electronically provides the specific video content on the selected multicast network channel.

910, the content selector switch 118 causes the specific video content on the selected multicast network channel to be output on the respective video channel mapped to the multicast network channel.

Figure 10:
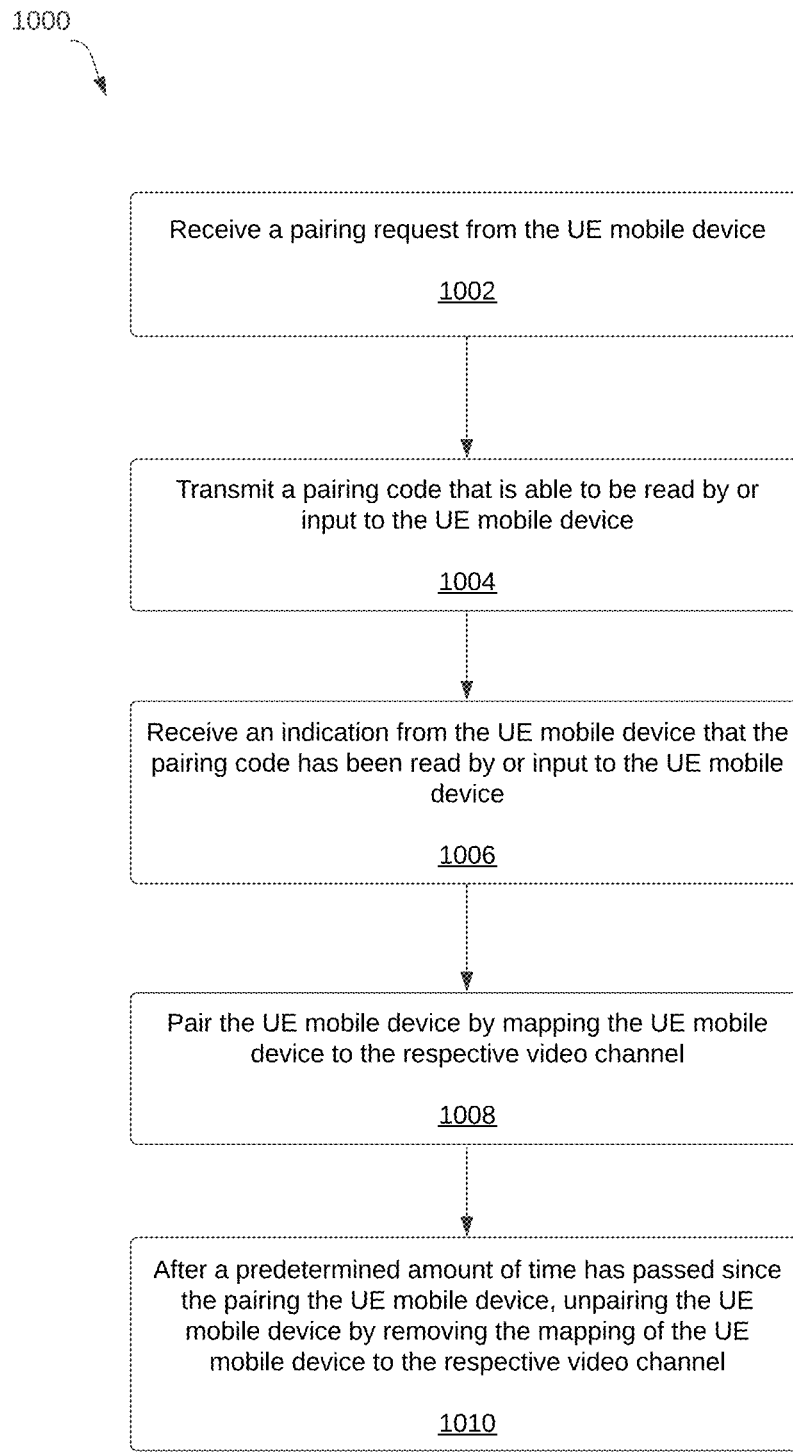
FIG. 10 is a flow diagram of an example method, useful in the method of FIG. 9, for pairing the UE mobile device for selective content distribution, according to one non-limiting embodiment.

FIG. 10 is a flow diagram of an example method 1000, useful in the method 900 of FIG. 9, for pairing the UE mobile device for selective content distribution, according to one non-limiting embodiment. In an example embodiment, the actions of method 1000 may be performed before the electronically receiving of the request for the particular video content in method 900.

At 1002, the content selector switch 118 receives a pairing request from the UE mobile device. In some embodiments, a request for particular video content (e.g., a request to cast particular video content) may comprise or include the pairing request.

At 1004, in response to receiving the pairing request, the content selector switch 118 transmits a pairing code that is able to be read by or input to the UE mobile device, wherein the pairing code is mapped to the respective video channel. In various embodiments, the pairing code may be: a code transmitted wirelessly directly to the UE mobile device in response to the request; an ultrasonic code output via a device tuned to the respective video channel; an audio signal output via a device tuned to the respective video channel; a visual code output via a device tuned to the respective video channel and displayed on a presentation device; an IR code output via a device tuned to the respective video channel; or a QR code output via a device tuned to the respective video channel and displayed on a presentation device.

At 1006, the content selector switch 118 receives an indication from the UE mobile device that the pairing code has been read by or input to the UE mobile device.

At 1008, the content selector switch 118, in response to receiving the indication, pairs the UE mobile device (e.g., by mapping the UE mobile device to the respective video channel which may be associated with a particular presentation device).

At 1010, in some embodiments, after a predetermined amount of time has passed since the pairing the UE mobile device, the content selector switch 118 or UE mobile device unpairs the UE mobile device by removing the mapping of the UE mobile device to the respective video channel.

While various embodiments have been described hereinabove, it is to be appreciated that various changes in form and detail may be made without departing from the scope of the invention(s) presently or hereafter claimed.

The invention claimed is:

1. A system for selective content distribution, the system comprising:
   at least one processor; and
   at least one memory coupled to the at least one processor, wherein the at least one memory has computer-executable instructions stored thereon that, when executed by the at least one processor, cause operations to be performed, the operations including:
   electronically receiving a request for particular content via user equipment (UE) mobile device mapped to a respective channel;
   electronically retrieving the particular content; electronically selecting, based on the request and the respective channel, a multicast network channel mapped to the respective channel, the multicast network channel being a multicast network channel of a plurality of multicast network channels on which to provide the requested particular content, wherein each multicast network channel of the plurality of multicast network channels is electronically mapped to a respective channel of a plurality of channels;

electronically providing the specific content on the selected multicast network channel;

causing the specific content on the selected multicast network channel to be output on the respective channel mapped to the multicast network channel; and before electronically receiving the request for particular content:

receiving a pairing request from the UE mobile device;

in response to receiving the pairing request, transmitting a pairing code that is able to be read by or input to the UE mobile device, wherein the pairing code is mapped to the respective channel;

receiving an indication from the UE mobile device that the pairing code has been read by or input to the UE mobile device; and in response to receiving the indication, pairing the UE mobile device by mapping the UE mobile device to the respective channel.

2. The method of claim 1 wherein the plurality of channels is a plurality of radio frequency (RF) channels and the respective channel mapped to the multicast network channel is a respective RF channel of the plurality of radio frequency RF channels.

3. The system of claim 2 wherein the selecting, based on the request, a multicast network channel includes:

identifying which UE mobile device of a plurality of controller UE mobile devices sent the request, wherein each UE mobile device of the plurality of UE mobile devices is mapped to a respective RF channel; and selecting the respective multicast network channel that is mapped to a respective RF channel the identified UE mobile device is mapped to.

4. The system of claim 2 wherein the receiving a request for particular content includes receiving the request over a different network separate from a network on which the plurality of multicast network channels is on.

5. The system of claim 2 wherein the operations further include:

electronically receiving one or more commands to: stop, rewind, fast-forward or play the particular content;

in response to receiving the one or more commands, causing the particular content to be stopped, rewound, fast-forwarded or played on the respective channel mapped to the multicast network channel.

6. The system of claim 2 wherein the operations further include:

causing the output on the respective RF channel mapped to the multicast network channel to be received by a respective presentation device for which presentation of on the respective presentation device is controlled by the UE mobile device that sent the request, in which the UE mobile device that sent the request sent the request over a wireless network separate from a network on which the plurality of multicast network channels is on.

7. The system of claim 2 wherein the operations further include:

causing the output on the respective RF channel mapped to the multicast network channel to be output over an RF coaxial television cable network and received by a respective presentation device of a plurality of presentation devices directly connected to the RF coaxial television cable network, wherein playing of on the presentation device is controlled by a UE mobile device that sent the request over a wireless network different and separate from the RF coaxial television cable network and different and separate from a network on which the plurality of multicast network channels is on.

8. The system of claim 2 wherein the operations further include:

causing the output on the respective RF channel mapped to the multicast network channel to be output over a wireless network and received by a respective presentation device of a plurality of presentation devices connected to the wireless network, wherein playing of on the presentation device is controlled by a remote control device that sent the request over a different wireless network separate from the wireless network on which the respective RF channel is output and different and separate from a network on which the plurality of multicast network channels is on.

9. The system of claim 2 wherein the retrieving of the particular content includes:

retrieving the particular content via a unicast or multicast connection over the Internet from a content server of a streaming media content provider platform.

10. The system of claim 2 wherein the retrieving the particular content includes:

retrieving the particular content as streaming media content directly from a device that converts broadcast satellite or cable signals to the streaming media content.

11. The system of claim 2, wherein each multicast network channel of the plurality of multicast network channels is mapped to a respective RF channel via a specific multicast address identifying the multicast network channel.

12. The system of claim 2 wherein:

the request is received from a UE mobile device of a plurality of UE mobile devices;

each UE mobile device of the plurality of UE mobile devices is mapped to a respective RF channel of the plurality of RF channels;

the respective RF channel mapped to the multicast network channel is the respective RF channel mapped to the UE mobile device from which the request is received; and the request is received from a UE mobile device over: a WiFi network; a fifth generation (5G) wireless network; a Citizens Broadband Radio Service (CBRS) network; or a Zigbee network.

13. The system of claim 2 wherein:

the request is received from a UE mobile device of a plurality of UE mobile devices;

each UE mobile device of the plurality of UE mobile devices is mapped to a respective RF channel of the plurality of RF channels;

the respective RF channel mapped to the multicast network channel is the respective RF channel mapped to the UE mobile device from which the request is received; and the operations further include causing the plurality of UE mobile devices to dynamically map to whatever RF channel of the plurality of RF channels an output device that is in proximity to UE mobile device is tuned to.

14. The system of claim 2 wherein:

the request is received from a UE mobile device of a plurality of remote control devices;

each remote control device of the plurality of UE mobile devices is mapped to a respective RF channel of the plurality of RF channels;

the respective RF channel mapped to the multicast network channel is the respective RF channel mapped to the UE mobile device from which the request is received; and the operations further include causing a device controlled by the UE mobile device to change to the RF channel the remote control device is mapped to upon every activation of a power-on user interface element of the remote control device.

15. The system of claim 2 wherein:

the request is received from a UE mobile device of a plurality of remote control devices;

each remote control device of the plurality of UE mobile devices is mapped to a respective RF channel of the plurality of RF channels;

the respective RF channel mapped to the multicast network channel is the respective RF channel mapped to the UE mobile device from which the request is received; and the operations further include, upon every activation of a power-on user interface element of the remote control device:

mapping the UE mobile device to an RF channel from a bank of available RF channels of the plurality of RF channels to which to map the UE mobile device; and causing a device controlled by the UE mobile device to change to the RF channel the remote control device is mapped to.

16. The system of claim 1 wherein the retrieving the particular content includes streaming the particular content from a streaming media content provider based on an indication of the streaming media content provider received in the request for particular content.

17. The system of claim 1 wherein the operations further include:

after a predetermined amount of time has passed since the pairing the UE mobile device, unpairing the UE mobile device by removing the mapping of the UE mobile device to the respective channel.

18. A method for selective distribution, the method comprising:

electronically receiving a request for particular content via user equipment (UE) mobile device mapped to a respective channel;

electronically retrieving the particular content;

electronically selecting, based on the request and the respective channel, a multicast network channel mapped to the respective channel, the multicast network channel being a multicast network channel of a plurality of multicast network channels on which to provide the requested particular content, wherein each multicast network channel of the plurality of multicast network channels is electronically mapped to a respective channel of a plurality of channels;

electronically providing the specific content on the selected multicast network channel;

causing the specific content on the selected multicast network channel to be output on the respective channel mapped to the multicast network channel; and before electronically receiving the request for particular content:

receiving a pairing request from the UE mobile device;

transmitting a pairing code that is able to be read by or input to the UE mobile device, wherein the pairing code is mapped to the respective channel;

receiving an indication from the UE mobile device that the pairing code has been read by or input to the UE mobile device; and in response to receiving the indication, pairing the UE mobile device by mapping the UE mobile device to the respective channel.

\* \* \* \* \*